United States Patent
Steiner

(10) Patent No.: US 7,602,153 B2
(45) Date of Patent: Oct. 13, 2009

(54) CONCEPT FOR PROVIDING A REGULATED, LIMITED GENERATOR EXCITATION CURRENT TO A GENERATOR

(75) Inventor: Manfred Steiner, Bad Gams (AT)

(73) Assignee: Infineon Technologies Austria AG, Villach (AT)

( * ) Notice: Subject to any disclaimer, the term of this patent is extended or adjusted under 35 U.S.C. 154(b) by 361 days.

(21) Appl. No.: 11/564,560

(22) Filed: Nov. 29, 2006

(65) Prior Publication Data
US 2008/0116858 A1  May 22, 2008

(30) Foreign Application Priority Data
Nov. 16, 2006  (EP) .................. 06023850

(51) Int. Cl.
*H02P 9/10* (2006.01)
(52) U.S. Cl. .............. 322/59; 322/23; 322/37; 322/47
(58) Field of Classification Search .......... 322/23, 322/37, 47, 59
See application file for complete search history.

(56) References Cited

U.S. PATENT DOCUMENTS

| 5,508,601 | A | 4/1996 | Good et al. ............ 322/37 |
| 6,900,618 | B2 | 5/2005 | Machara ............. 322/27 |
| 7,365,519 | B2 * | 4/2008 | Gibbs et al. ............ 322/28 |
| 7,459,889 | B2 * | 12/2008 | Ganev et al. ............ 322/37 |
| 2005/0218815 | A1 | 10/2005 | Kobayashi et al. ........ 315/78 |
| 2006/0108987 | A1 | 5/2006 | Aoyama ................. 322/28 |

FOREIGN PATENT DOCUMENTS

DE  10 2005 014 136 A1  10/2005
EP     1 187 307 A2   3/2002

OTHER PUBLICATIONS

European Search Report and Written Opinion for European Application No. 06 02 3850 (6 pages), May 21, 2007.

* cited by examiner

*Primary Examiner*—Nicholas Ponomarenko
*Assistant Examiner*—Iraj A Mohandesi
(74) *Attorney, Agent, or Firm*—Eschweiler & Associates, LLC

(57) ABSTRACT

A device for providing a regulated, limited generator excitation current to a generator to acquire a regulated output voltage of the generator, the device including a combiner for weighted combining a first system deviation on the basis of a setpoint voltage and of the regulated output voltage, and a second system deviation on the basis of a predefined current value and of the regulated generator excitation current so as to acquire a combination signal based on the combination of the first system deviation and the second system deviation, a provider for providing a actuating variable on the basis of the combination signal and a regulation specification, and a provider for providing the regulated, limited generator excitation current to the generator on the basis of the actuating variable, so that the regulated output voltage may be provided by the generator.

16 Claims, 4 Drawing Sheets

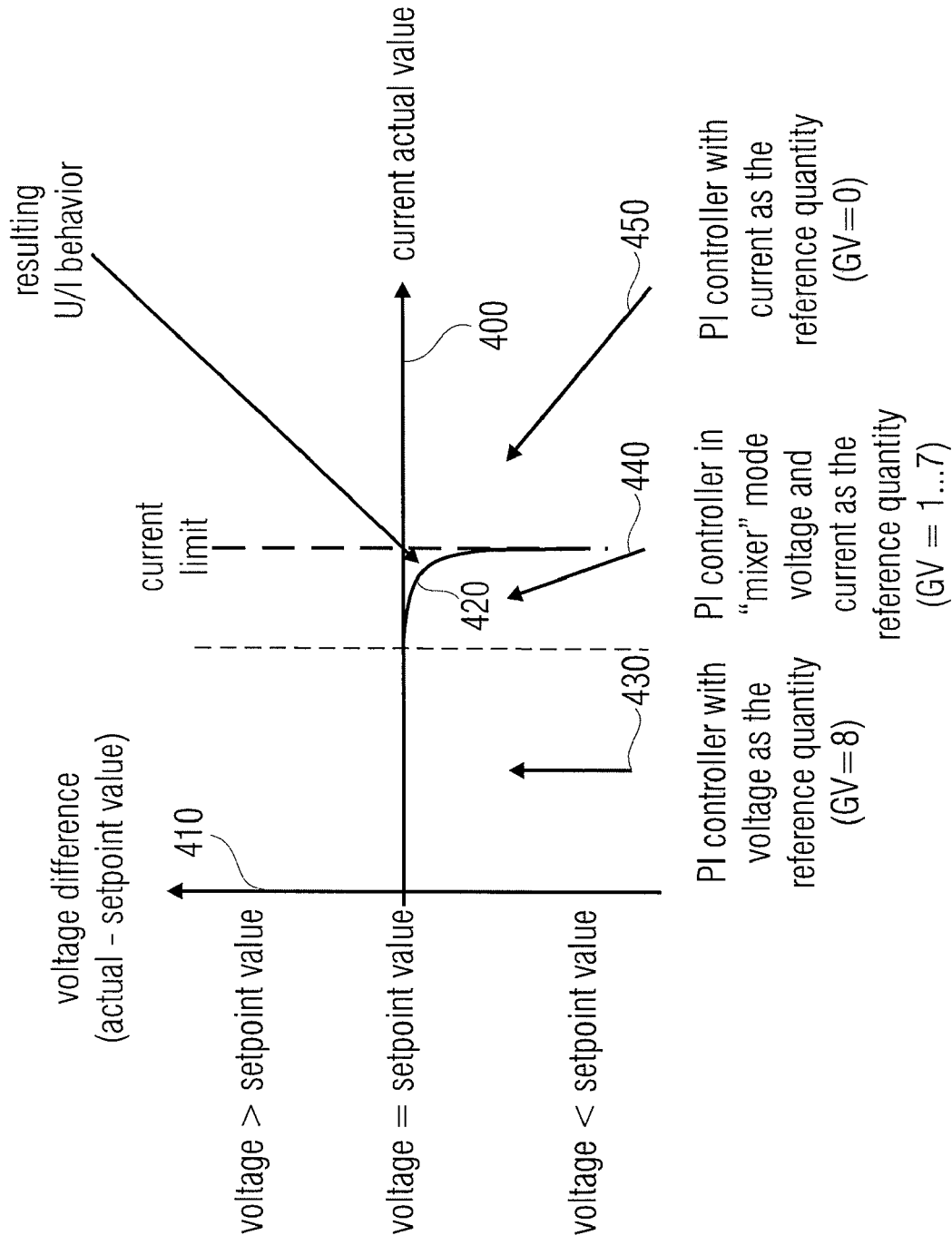

CONCEPT FOR PROVIDING A REGULATED, LIMITED GENERATOR EXCITATION CURRENT TO A GENERATOR

RELATED APPLICATIONS

This application claims priority from European Patent Application No. 06023850.8 which was filed on Nov. 16, 2006, and is incorporated herein by reference in its entirety.

TECHNICAL FIELD

The present invention relates to a concept for providing a regulated, limited generator excitation current to a generator to obtain a regulated output voltage of the generator, as may be employed, in particular, for providing a regulated voltage at a voltage generator within a motor vehicle.

BACKGROUND

For supplying electronic components within a motor vehicle, a generator, in particular an alternator, is generally used in addition to a vehicle battery. The generator, or alternator, is driven by a running motor as a secondary unit. The drive may be effected, for example, by means of a belt drive or directly via a crankshaft.

With a driven alternator, a current is provided by same, for example for charging the vehicle battery and for loads connected to an on-board network. The alternator transforms mechanical energy provided by the motor into electric energy, the mechanical power necessary being approximately proportional to the electrical power output. A non-regulated voltage provided by an alternator strongly varies with the rate of rotation of the motor and the load connected. Since an alternator should be able to build up the nominal voltage of the motor vehicle on-board network at a low motor speed already, it is generally oversized. To keep it from exceeding, as a consequence, an admissible final charging voltage of the vehicle battery in the event of a high rate of rotation, the voltage is generally limited to a maximum value by a regulator.

With three-phase current alternators, the electrically generated excitation field of the driven alternator rotor is influenced by an integrated circuit, i.e. by the electronic charging regulator, which is typically implemented on a side opposite the driving end. The regulator generally compares a rectified actual voltage at the output of the generator with a regulator-internal stable reference voltage and/or a setpoint voltage value, and adjusts the strength of the excitation field by means of a higher or lower level of generator excitation current flow through the rotor such that the actual voltage of the generator remains at least approximately constant independently of the load and speed. Conventionally, it is only the generator output voltage that is regulated in this context. However, the generator excitation current is generally not limited by the regulator.

What would also be desirable in addition to voltage regulation is a current limitation so that the mechanical load of the motor and gear box may be limited by the generator of a motor control device. It should be possible for the current limitation value to be set, for example, by the motor control device.

SUMMARY

In accordance with embodiments, a device for providing a regulated, limited generator excitation current to a generator to obtain a regulated output voltage of the generator is provided, the device comprising a means for weighted combining a first system deviation on the basis of a setpoint voltage and of the regulated output voltage, and a second system deviation on the basis of a predefined current value and of the regulated generator excitation current so as to obtain a combination signal based on the combination of the first system deviation and the second system deviation, a means for providing a actuating variable on the basis of the combination signal and a regulation specification, and a means for providing the regulated, limited generator excitation current to the generator on the basis of the actuating variable, so that the regulated output voltage may be provided by the generator.

In accordance with further embodiments, a method for providing a regulated, limited generator excitation current to a generator to obtain a regulated output voltage of the generator is provided, the method comprising a step of weighted combining a first system deviation on the basis of a setpoint voltage and of the regulated output voltage, and a second system deviation on the basis of a predefined current value and of the regulated generator excitation current so as to obtain a combination signal based on the combination of the first system deviation and the second system deviation, a step of providing a actuating variable on the basis of the combination signal and a regulation specification, and a step of providing the regulated, limited current to the generator on the basis of the actuating variable, so that the regulated output voltage may be provided by the generator.

Thus, embodiments of the present invention have the advantage that a mechanical load of the motor and gear box by the generator may be limited by the current limitation.

BRIEF DESCRIPTION OF THE DRAWINGS

Preferred embodiments of the present invention will be explained below in more detail with reference to the accompanying figures, wherein:

FIG. 4 is a diagram for illustrating simultaneous current and voltage regulation in accordance with an embodiment.

DETAILED DESCRIPTION

Figure 1:
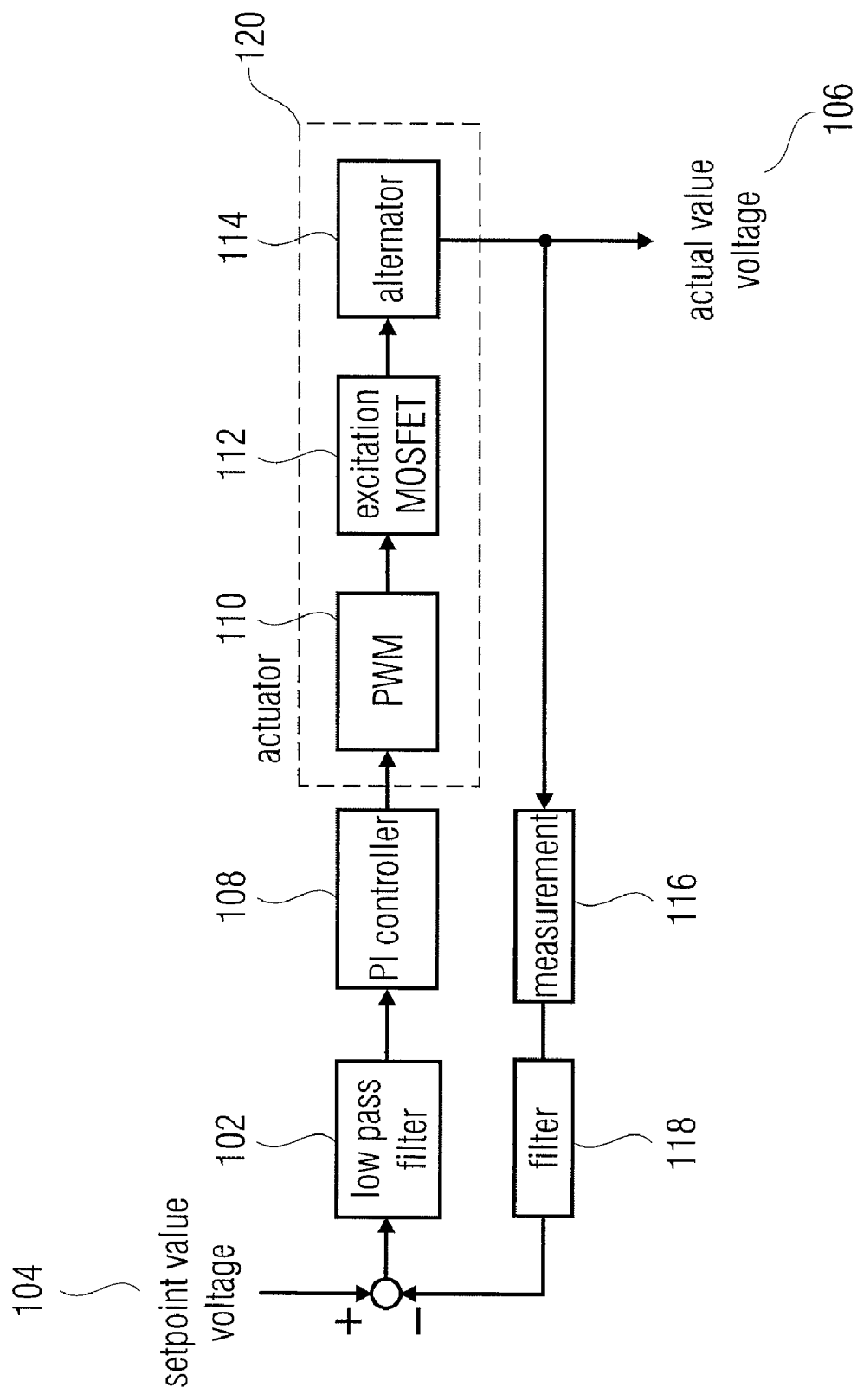
FIG. 1 is a block diagram of a conventional motor vehicle voltage generator regulator.

Regarding the following description, it should be noted that in the various embodiments, functional elements which are identical or have identical actions exhibit identical reference numerals, and that the descriptions of these functional elements are thus interchangeable in the various embodiments presented below.

Before embodiments will be described and explained in more detail below with reference to FIGS. 2 to 4, the architecture and mode of operation of a conventional voltage generator as is used, for example, in the automotive field is to be described in the following with reference to FIG. 1.

FIG. 1 shows the schematic block diagram of a regulator circuit for regulating a voltage provided by a generator as may be used, for example, in motor vehicles.

The regulator circuit includes a low-pass filter 102 having an input for a system deviation from a setpoint voltage value 104 and from a measured value of an actual voltage 106. The output of low-pass filter 102 is coupled to an input of a PI controller 108. An output of PI controller 108 is wired to an input of a pulse width modulator 110 (PWM=pulse width modulation), the output of which, in turn, is coupled to a control terminal of a regulating transistor 112. At an output, regulating transistor 112 provides a regulated excitation current for a generator and/or an alternator 114, at the output of which the actual voltage value 106 is present. The actual voltage value is fed back via a measuring device 116 and a filter 118 to form, together with the setpoint voltage value 104, a system deviation at the input of low-pass filter 102. In the structure, depicted in FIG. 1, of the regulator circuit, pulse width modulator 110, regulating transistor 112 and generator 114 together form an actuator 120 of the regulator circuit.

With generator regulators, as depicted in FIG. 1, only the voltage 106 which is provided by generator 114 is measured, and using the PI controller 108, the actuator 120 which sets the voltage 106 is controlled. In the conventional configuration, depicted in FIG. 1, of a generator regulator, a load on a motor and gear box of a motor vehicle by the generator and/or alternator 114 may be influenced by a control device only in accordance with the following principles.

On the one hand, a motor control device may activate and/or deactivate the generator regulator and/or the locked loop depicted in FIG. 1. This method has the disadvantage that during the deactivation of the vehicle battery, a current supply must take over instead of generator 114. With vehicles exhibiting high power consumption, this presents a significant problem.

In addition, a motor control device could predefine a smaller setpoint voltage value 104 to lighten the load on the motor and gear box. A sufficiently fine limitation of the mechanical power of generator 114 is not possible, however, since with the generator regulator depicted in FIG. 1, there is no measurement of the generator excitation current, and the motor control device cannot change the setpoint voltage value 104 in a sufficiently rapid and fine manner. This is generally due to a communication interface employed and the communication protocol used in this context.

The two blocks 102 and 118 together form a "decimation". Block 118 is, for example, a pure mixer stage wherein, e.g., 32 or 64 measured values of an ADC (ADC=analog digital converter) may be summed. For example, block 102 may be a first-order digital low-pass. Together, the two blocks 102 and 118 will yield a decimation of 32 or 64, respectively, measured values to a "voltage measurement value", it being possible for an optimum, deliberate suppression to arise in the range of certain frequencies. The summation point may be arranged, for example, both prior to block 118 or between blocks 118 and 102. A measured value of an ADC is generally corrected with regard to gain and/or offset. It may therefore be useful to additionally insert a measured-value correction between blocks 116 and 118 so as to be able to correct measured values of an ADC.

It shall be pointed out here that the generator excitation current and the motor speed together essentially determine the mechanical power and/or the mechanical moment of generator 114.

Now that the structure and mode of operation of a conventional generator regulator have been described above with reference to FIG. 1, which included demonstrating that the load on the motor and gear box imposed by generator 114 may be influenced only to a limited degree by a motor control device, embodiments will be explained below in more detail with reference to FIGS. 2 to 4.

Figure 2:
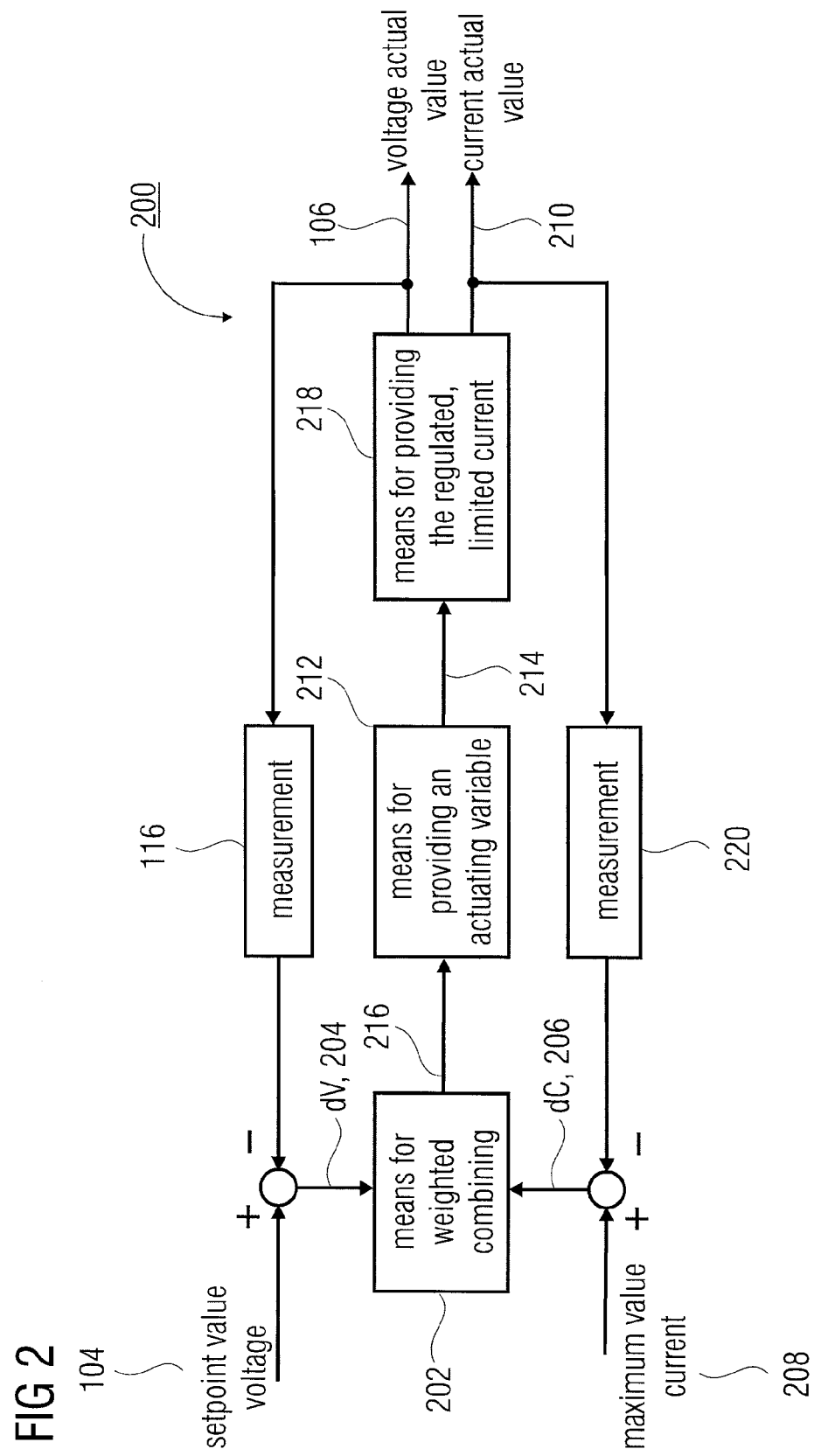
FIG. 2 is a block diagram of a voltage regulator comprising a current limitation in accordance with an embodiment.

FIG. 2 shows a device 200 for providing a regulated, limited generator excitation current to a generator to obtain a regulated output voltage of the generator, in accordance with an embodiment.

Device 200 includes a means 202 for combining, in a weighted manner, a first system deviation 204 on the basis of a setpoint voltage 104 and a regulated voltage 106 and a second system deviation 206 on the basis of a predefined current value 208 and of a regulated, limited generator excitation current 210. The first system deviation 204 and the second system deviation 206 are each present at an input of means 202 for combining in a weighted manner. Means 202 for combining in a weighted manner is coupled, on the output side, to a means 212 for providing a actuating variable 214 on the basis of a combination signal 216 and a regulation specification. Via actuating variable 214, the output of means 212 is coupled to a means 218 for providing the regulated limited current 210, based on actuating variable 214, so that regulated voltage 106 may be provided by the generator.

In accordance with an embodiment, the predefined current value 208 represents a maximum current value for the generator excitation current 210.

In accordance with further embodiments, means 202 for combining in a weighted manner determines a weighting factor GV to obtain a weighted influence of the first system deviation 204 and of the second system deviation 206, respectively, on the combination signal 216 at the output of means 202. In accordance with embodiments, the weighting factor GV determined behaves, for example, in a proportional manner to the second system deviation 206, and in an inversely proportional manner to the first system deviation 204. This means that the larger the second system deviation 206, and/or the larger the deviation of the actual current value 210 from the predefined current value 208, the larger the weighting factor GV will be. On the other hand, it is true that the larger the first system deviation 204 and/or the larger the deviation of the regulated voltage 106 from the setpoint voltage value 104, the smaller the weighting factor GV will be. Naturally, the dependencies of weighting factor GV on system deviations 204 and 206 may also be selected differently.

In accordance with further embodiments, the weighting factor GV determined comprises a lower $L_l$ and an upper limitation value $L_u$, the combination signal 216 depending only on the second system deviation 206 when the lower limitation value $L_l$ is reached, and depending only on the first system deviation 204 when the upper limitation value $L_u$ is reached. In accordance with further embodiments, this dependence may also be selected the other way round.

In one embodiment, means 202 for combining in a weighted manner forms the combination signal 216 from a combination of a product of the first system deviation 204 with a square portion of weighting factor GV, and a product of the second system deviation 206 with a linear portion of weighting factor GV. This conversion of system deviations 204, 206 to the regulation input quantity and/or the combination signal 216 is conducted differently so that, for example, regulation parameters $k_I$ and $K_p$ can remain the same.

In accordance with embodiments, means 212 for providing comprises a PI controller, the PI controller signifying a fusion of a proportional controller and an integral controller. Depending on the implementation of means 202 for combining in a weighted manner and of means 218 for providing the regulated current, means 212 for providing the actuating variable 214 may naturally also comprise different forms of controllers or regulators such as, for example, a proportional controller, an integral controller, a differential controller or controllers combined from said controllers.

In accordance with an embodiment, actuating variable 214 corresponds to a duty cycle of a pulse width modulation. A pulse width modulated control signal may subsequently be demodulated, for example to be coupled to a control terminal of a regulating transistor.

In accordance with further embodiments, the actuating variable 214 may also directly form a control signal for a regulating transistor, such as a control voltage or a control current. To this end, in accordance with embodiments, means 202 for weighted combining or means 212 for providing may comprise at least one regulating amplifier to obtain, at an output of the regulating amplifier, actuating variable 214 and/or the control voltage or the control current and/or a signal which may be derived from actuating variable 214.

The device, described with reference to FIG. 2, for providing a regulated limited generator current, may be employed, for example, in motor vehicles for controlling the alternator. A current maximum 208 may also be set in addition to a setpoint voltage value 104. Thereby, a motor control device may limit the mechanical load of the generator in a targeted manner, whereby new possibilities may be made available to a motor management. Additionally, current measurement is necessary to limit the current, as is indicated in FIG. 2 by reference numeral 220.

Compared to conventional generator regulators, as shown in FIG. 1, the PI controller 108 previously employed is upgraded in that in addition to voltage difference 204, also current quantity 210 and/or current difference 206 influence(s) the calculation of the system deviation. The advantage of such a concept is that no switch-over need occur between two different regulators (voltage regulator, current regulator), and that therefore no disruptive switch-over effects are possible.

Thus, according to an embodiment, two different regulating requirements are implemented using one regulator core. An effective system deviation is formed by mixing the two system deviations 204 and 206 of the two quantities to be regulated (voltage, current).

In accordance with embodiments, an integrated circuit has a device 200, described using FIG. 2, for providing a regulated limited generator excitation current for obtaining a regulated generator output voltage. Such an integrated circuit, which may be located, for example, within a motor control device, may be used, for example, to regulate a motor vehicle on-board voltage VB+A (voltage battery+alternator). The setpoint voltage 104 may be predefined by a control device for a 12V on-board network, for example within a range from 10.7 volt to 16 volt in 100 mV steps. The range indicated here is only an example of setpoint voltage 104. Of course, the different embodiments may also be applied to other voltage ranges with other voltage steps, for example to voltage ranges from 5V to 60V, or more, so that common motor vehicle on-board networks, such as 24V or 42V on-board networks are included within the voltage ranges.

The motor vehicle on-board voltage VB+A is generally generated by a 3-phase generator including bridge rectification. The 3 phases are within the stator of the generator, and the rotating field is generated using a rotating excitation coil supplied with a generator excitation current. The generator excitation current is supplied via slip rings, for example. The speed of the coil is dependent on the driving situation and/or the motor speed and cannot be influenced by a control IC.

Figure 3:
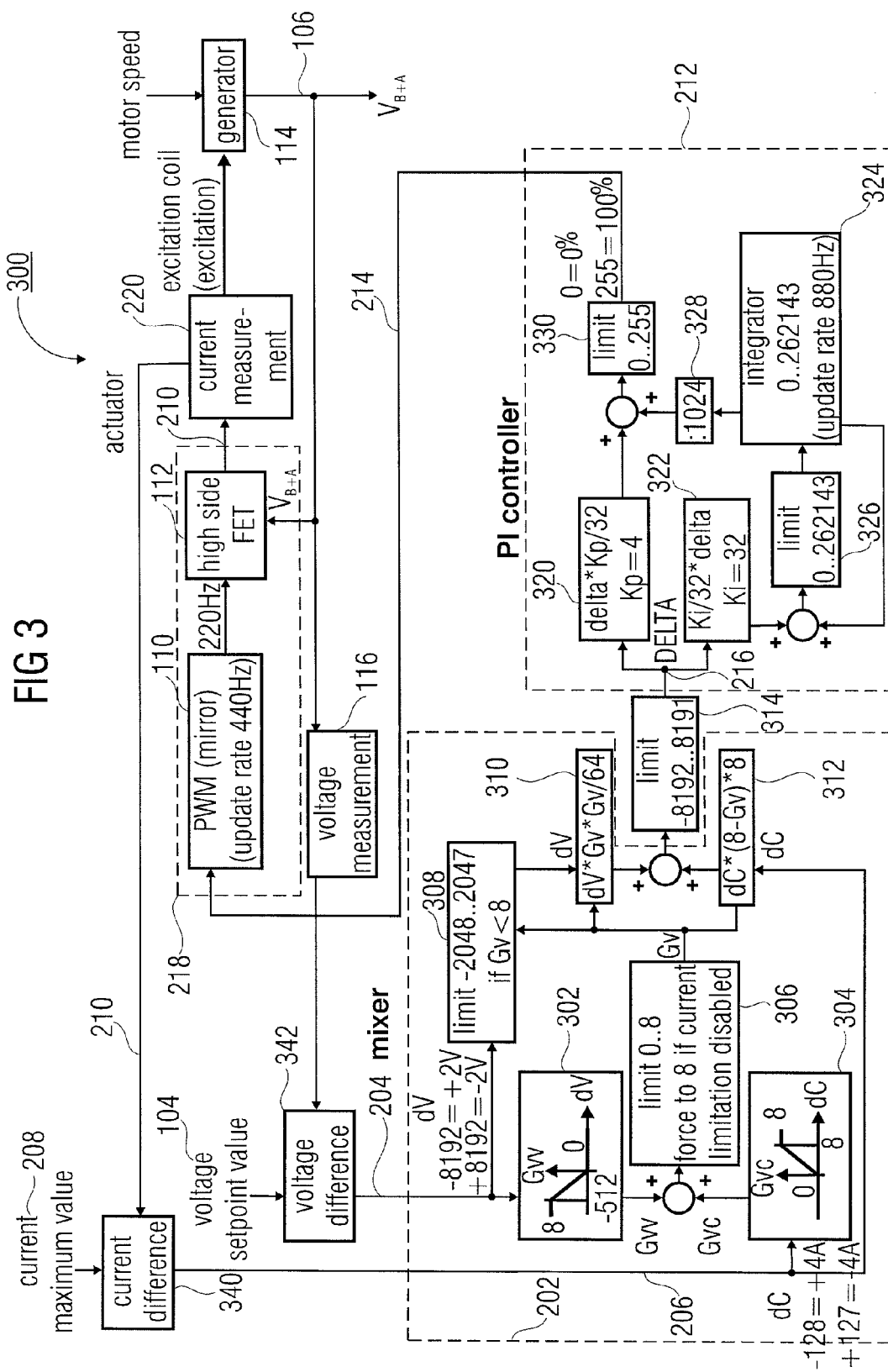
FIG. 3 is a block diagram of an integrated circuit for controlling an alternator in accordance with an embodiment.

FIG. 3 depicts a block diagram of a control device 300, according to an embodiment, for providing a regulated, limited generator excitation current to a generator 114 so as to obtain a regulated output voltage 106 of generator 114.

Control device 300 comprises a mixer and/or a means 202 for weighted combining, a PI controller and/or a means 212 for providing a actuating variable, and an actuator and/or a means 218 for providing the regulated, limited generator excitation current, on the basis of actuating variable 214, so that regulated voltage 106 may be provided by generator 114. Means 202 and/or the mixer comprises an input for a first system deviation dV 204, on the basis of a setpoint voltage value 104 and the regulated voltage 106, the range of values of the first system deviation dV 204 comprising a range from −8192 (+2V) to +8191 (−2V) in the embodiment depicted in FIG. 3, in correspondence with a digital 14 bits signal. The ranges of values for the first system deviation dV 204 depend, for example, on digital word widths available and may be adapted to various specifications. In addition, mixer 202 comprises a second input for a second system deviation dC 206, on the basis of a maximum current value 208 and the regulated current 210, the range of values of the second system deviation dC 206 comprising a range from −128 (+4 A) to +127 (−4 A) in the embodiment shown in FIG. 3, corresponding to a digital 8 bits signal. The ranges of values for the second system deviation dC 206 depend, for example, on available digital word widths and may be adapted to various specifications.

Depending on the first system deviation dV 204, in a block 302, a first preliminary weighting factor GVV is formed which is inversely proportional to the first system deviation dV 204. If, in the embodiment shown in FIG. 3, the first system deviation dV 204 has a digital value smaller than $dV_{min}=-512$, the preliminary weighting factor GVV is set to an upper limitation value $L_u=8$. From a value of $dV_{max}=0$ for the first system deviation dV 204, a lower limitation value of $L_l=0$ will result for GVV. Thus, GVV is determined in accordance with the following specification:

$$G_{vv} = \begin{cases} L_u & \text{for } dV \leq dV_{min} \\ L_u - \frac{(L_u - L_l)}{dV_{max} - dV_{min}} \cdot dV & \text{for } dV_{min} < dV < dV_{max}, \\ L_l & \text{for } dV \geq dV_{max} \end{cases} \quad (1)$$

wherein $dV_{min}=-512$, $dV_{max}=0$, $L_l=0$ und $L_u=8$.

A further preliminary weighting factor GVC is formed as a function of the second system deviation dC 206 within a block 304, said preliminary weighting factor GVC being proportional to the second system deviation dC 206. If, in the embodiment shown in FIG. 3, the second system deviation dC 206 has a digital value smaller than $dC_{min}=0$, the preliminary weighting factor GVC will be set to the lower limitation value $L_u=0$. From a value of $dC_{max}=8$ for the second system deviation dC 206, the upper limitation value of $L_u=8$ will result for GVC. Here, GVC is thus determined in accordance with the following specification:

$$G_{vc} = \begin{cases} L_l & \text{for } dC \leq dC_{min} \\ dC & \text{for } dC_{min} < dC < dC_{max}, \\ L_u & \text{for } dC \geq dC_{max} \end{cases} \quad (2)$$

It shall be noted at this point that in accordance with further embodiments, the functions defined portion-by-portion and indicated in equations (1) and (2) may also have different forms. The ranges of values for $dV_{min}$, $dV_{max}$, $dC_{min}$, $dC_{max}$, $L_l$ and $L_u$ depend e.g., on digital word widths which are available, and may be adapted to various specifications. In addition, the present embodiments are also not limited to digital values, but may also be applied to analog signals.

The preliminary weighting factors GVV and GVC present at the outputs of blocks 302 and 304 are added to form a weighting factor GV which is limited here to a range of values from $L_l$ to $L_u$ by a block 306. If the current limitation is to be switched off in the control device shown in FIG. 3, weighting factor GV is set to the predefined value of $L_u$ in block 306. Naturally, ranges of values different from those described are also feasible.

If the weighting factor GV present at the output of block 306 is smaller than the predefined value $L_u$ (here $L_u=8$), i.e. $GV<L_u$, the first system deviation dV 204 will be limited, within block 308, to a predefined range of values, for example $-2048 \leq dV \leq 2047$. In a block 310, at whose inputs GV and the dV limited in accordance with block 308 are present, a first intermediate value is formed in accordance with the specification $$\frac{GV^2}{L_u^2} \cdot dV \quad (3)$$

wherein $L_u=8$. By means of a block 312, at whose first input GV is present, and at whose second input dC 206 is present, a second intermediate value is formed in accordance with $$L_u(L_u-GV) \cdot dC \quad (4)$$

wherein $L_u=8$. The first and second intermediate values are added, and the sum is subsequently limited, in a block 314, to a predefined range of values, for example to a range of values from −8192 to 8191, i.e. a digital 14 bits signal. The combination signal delta 216 based on first system deviation dV 204 and on second system deviation dC 206 is present at the output of block 314. Of course, ranges of values different from those described with reference to FIG. 3 are also feasible here for the combination signal delta 216.

Combination signal delta 216 forms the input to PI controller 212. Within same, combination signal delta 216 is passed into a P controller block 320 and into an I controller block 322. The output signal of P controller block 322 is formed in accordance with $$\text{delta} \cdot K_I / 32 \quad (5)$$

wherein $K_I=32$, is added with a fed-back signal of an integrator stage 324, the resulting sum is limited to a predefined range of values by means of a block 326, and is fed to integrator stage 324. Within the integrator stage 324, the signal may be accumulated within a predefined range of values, for example 0 . . . 262143, a refresh rate of the integrator stage amounting to, for example, 880 Hz. An output signal of integrator stage 324 is divided, by means of a block 328, by a predefined value, for example 1024, and added with an output signal of P controller block 320. In the process, the output of P controller block 320 is formed in accordance with $$\text{delta} \cdot K_p / 32 \quad (6)$$

wherein $K_p=4$. This sum is limited, by means of a block 330, to a predefined range of values, for example to a range of values from 0 to 255, corresponding to an 8 bits signal. The output signal 214 of block 330 forms the actuating variable, based on the combination signal delta 216 and on the regulation specification of PI controller 212.

In the embodiment which is depicted in FIG. 3, signal 214 forms a duty cycle of a pulse width modulator 110 coupled to signal 214. In accordance with an embodiment, pulse width modulator 110 works with a refresh rate of, e.g., 440 Hz, and provides, at its output, a pulse width modulated signal having a fixed frequency of, e.g., 220 Hz. With this pulse width modulated signal, a regulating transistor, or high-side transistor, 112 is controlled, which at the same time is supplied via the regulated motor vehicle on-board voltage VB+A. Here, the regulating transistor 112 may be a field-effect or a bipolar transistor, for example. A generator regulator current provided by regulating transistor 112 is subjected to a current measurement by block 220 so as to feed back the measured current value to a block 340 for forming the second system deviation. The generator excitation current provided by regulating transistor 112 is fed, in a pulse-by-pulse manner, to an excitation coil of generator 114 after it has been measured. Thereby, a generator excitation current smoothed via inductance L and resistor R of the coil is yielded. A voltage VB+A 106 which is dependent on the motor speed and the excitation current is measured by means of a block 116 and is subsequently supplied to a block 342 for forming the first system deviation 204.

The excitation current for generator 114 may be limited by means of a specification concerning the maximum current value 208, in accordance with embodiments, e.g. within a range from 10 mA to 20 A and, preferably, within a range from 2 A to 8 A. For measuring the generator excitation current, block 220 comprises, for example, a shunt resistor to be able to measure the current in the freewheel path of generator 114. It may be useful to insert a "measured error correction" block between block 220.

In the embodiment shown in FIG. 3, the actuator 218 comprises a PWM block 110, the high-side transistor, or regulating transistor 112, a rotating excitation coil of generator 114, and the stator winding of generator 114 with a bridge rectification. In accordance with an embodiment, a battery may be located on the VB+A line, the battery having a damping effect on the entire regulation system. However, a regulation operation is possible with and without a battery.

Weighting factor GV is calculated in the manner described above within mixer 202. This factor establishes the extent to which system deviation dV 204 of the voltage is allowed to determine the regulator input quantity and/or the combination signal 216. In accordance with an embodiment, there is the following connection:

GV=8→only voltage regulator is active

GV=0→only current regulation (current limitation) is active $1 \leq GV \leq 7$→regulator is in a transition from voltage to current regulation.

The conversion of the system deviations dV 204 and/or dC 206 to the regulation input quantity and/or the combination signal delta 216 is conducted differently so that regulation parameters $k_I$ and $k_p$ can remain the same. The influence of the first system deviation dV 204 is determined, in accordance with an embodiment, by a square influence of weighting factor GV on combination signal delta 216, whereas second system deviation dC 206 is merely weighted linearly with weighting factor GV. In accordance with the circumstances and with further embodiments, there may also exist a different connection between dV 204 and/or dC 206, GV and delta 216.

In accordance with embodiments, the current limitation function of the control device, depicted in FIG. 3, for providing a regulated, limited generator excitation current may also be deactivated. This may be implemented, for example, in that weighting factor GV is set to its maximum value $L_u$, and in that no more calculation of weighting factor GV, as described above, is conducted. Current difference dC 206 will then have no influence on the regulator input quantity delta 216.

If the regulator circuit shown in FIG. 3 is in the mixer mode, setpoint voltage value 104 will generally not fully be achieved. This behavior is to be described below in more detail with reference to FIG. 4.

FIG. 4 shows a diagram which has the actual value of the generator excitation current plotted on its horizontal axis 400. The vertical axis 410 has the voltage difference between the actual and setpoint values plotted thereon. The curve designated by reference numeral 420 describes the resulting U/I behavior of a device, according to an embodiment, for providing a regulated, limited generator excitation current for obtaining a regulated output voltage of the generator.

Within the range designated by reference numeral 430, PI controller 212 works with a quantity, derived merely from the generator output voltage, as a reference quantity (GV=8). Within the range designated by reference numeral 440, PI controller 212 works within the mixer mode, and the reference quantity results, as has been described above with reference to FIG. 3, from a combination of first system deviation 204 and second system deviation 206 (1≦GV≦7). Within the range designated by reference numeral 450, PI controller 212 works with a reference quantity derived from the generator excitation current (GV=0).

It may be seen from FIG. 4 that generator output voltage 106 collapses in current regulation operation 440. As has already been described above, generator output voltage 106 results from the motor speed and the generator excitation current. To achieve a predefined generator output voltage and/or a setpoint value 104, a rather low generator excitation current is generally necessary at a high motor speed, conversely, a comparatively high generator excitation current is necessary at a low motor speed. If the generator excitation current is limited by a regulation mechanism as has been described above, the output voltage 106 provided by the generator will collapse, for example, at a relatively low motor speed, as is shown in range 440 in FIG. 4.

As has already been described above, the voltage may collapse in the event of active current limitation. When applying the concept according to the embodiments in a motor vehicle, this is not particularly dramatic, since the motor vehicle battery is present as an energy storage, and therefore electrical systems may be supplied with energy from the battery over a certain period of time. However, overvoltage states are to be avoided, since they may lead to a reduction in the battery's lifetime and, in extreme cases (e.g. at more than 16V in a 12V on-board network), give rise to a dangerous gasification process within the battery.

In summary, it may be stated that with the concept according to the embodiments for providing a regulated, limited generator excitation current to a generator to obtain a regulated output voltage of the generator, a current maximum 208 may also be set, in addition to a setpoint voltage value 104, with generator regulators. Thereby, a control device may limit a mechanical load of generator 114 in a targeted manner, which provides new possibilities to motor vehicle motor management. For current limitation, only current measurement will be additionally necessary.

The use according to the embodiments is by no means limited to the implementations and ranges of values described with reference to FIGS. 2 to 4. Rather, the weighted combination of first system deviation 204 and of second system deviation 206 may also be conducted in a different manner, and the regulation specification may also deviate from the PI control specification described here. An actuator of the regulator circuit may deviate from the embodiment described here and may provide a regulated limited generator excitation current on the basis of the actuating variable.

It shall be pointed out, in particular, that depending on the circumstances, the scheme according to the embodiments may also be implemented in software. The implementation may be effected on a digital storage medium, in particular a disc or CD comprising electronically readable control signals which may co-operate with a programmable computer system and/or microcontroller in such a manner that the respective method is performed. Thus, the invention generally also consists in a computer program product having a program code, stored on a machine-readable carrier, for performing the method, when the computer program product runs on a computer and/or a microcontroller. In other words, the invention may thus be realized as a computer program having a program code for performing the method for providing a regulated limited generator excitation current, when the computer program runs on a computer and/or microcontroller.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for providing a regulated, limited generator excitation current to a generator to acquire a regulated output voltage of the generator, the device comprising:
   a combiner for weighted voltage and of the regulated output voltage, and a second system deviation on the basis of a predefined current value and of the regulated generator excitation current so as to acquire a combination signal based on the combination of the first system deviation and the second system deviation;
   a provider for providing a actuating variable on the basis of the combination signal and a regulation specification; and
   a provider for providing the regulated, limited generator excitation current to the generator on the basis of the actuating variable, so that the regulated output voltage may be provided by the generator.

2. The device according to claim 1, wherein the predefined current value is a maximum current value for the generator excitation current.

3. The device according to claim 1, wherein the combiner for weighted combining uses a weighting factor to acquire a weighted influence of the first system deviation and the second system deviation, respectively, on the combination signal.

4. The device according to claim 3, wherein the weighting factor is proportional to the second system deviation and is inversely proportional to the first system deviation.

5. The device according to claim 3, wherein the weighting factor includes lower and upper limitation values, with the lower limitation value, the combination signal depending only on the second system deviation, and with the upper limitation value, the combination signal depending only on the first system deviation, or vice versa.

6. The device according to claim 3, wherein the combiner for weighted combining forms the combination signal from the first system deviation multiplied by a square portion of the weighting factor, and from the second system deviation multiplied by a linear portion of the weighting factor.

7. The device according to claim 1, the provider for providing the actuating variable comprising a PI controller.

8. The device according to claim 1, it being possible to set, by means of the actuating variable, a duty cycle of a pulse width modulation for a regulating transistor control signal.

9. The device according to claim 1, wherein the provider provides the regulated current within a range from 10 milliampere to 20 ampere.

10. The device according to claim 1, wherein the regulated output voltage of the generator is within a range from 5 volt to 60 volt.

11. A device for providing a regulated, limited generator excitation current to a generator to acquire a regulated output voltage of the generator, comprising:

a combiner comprising a first input for a first system deviation based on a setpoint voltage and the regulated output voltage, a second input for a second system deviation based on a predefined current value and the regulated generator current, and an output for a combination signal based on the weighted combination of the first system deviation and the second system deviation;

a regulator comprising an input for the combination signal and an output for a actuating variable on the basis of the combination signal and a regulation specification; and an actuator comprising an input for the actuating variable, and an output for the regulated limited generator excitation current, so that the regulated voltage may be provided by the generator.

12. The device according to claim 11, wherein the predefined current value is a maximum current value for the generator excitation current.

13. The device according to claim 11, wherein the combiner uses a weighting factor to acquire a weighted influence of the first system deviation and of the second system deviation, respectively, on the combination signal, the weighting factor being proportional to the second system deviation, and being inversely proportional to the first system deviation.

14. The device according to claim 13, wherein the combiner forms the combination signal from the first system deviation multiplied by a square portion of the weighting factor, and from the second system deviation multiplied by a linear portion of the weighting factor.

15. The device according to claim 11, the regulator comprising a PI controller.

16. The device according to claim 11, it being possible to set, by means of the actuating variable, a duty cycle of a pulse width modulation for a regulating transistor control signal.

* * * * *